United States Patent
Chen et al.

(10) Patent No.: US 12,183,915 B2
(45) Date of Patent: Dec. 31, 2024

(54) ANODE MATERIAL, AND ELECTROCHEMICAL DEVICE AND ELECTRONIC DEVICE USING THE SAME

(71) Applicant: NINGDE AMPEREX TECHNOLOGY LIMITED, Ningde (CN)

(72) Inventors: Zhihuan Chen, Ningde (CN); Daoyi Jiang, Ningde (CN); Hang Cui, Ningde (CN); Yuansen Xie, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 608 days.

(21) Appl. No.: 17/440,723

(22) PCT Filed: Mar. 5, 2020

(86) PCT No.: PCT/CN2020/077942
§ 371 (c)(1),
(2) Date: Sep. 17, 2021

(87) PCT Pub. No.: WO2020/187040
PCT Pub. Date: Sep. 24, 2020

(65) Prior Publication Data
US 2022/0173386 A1    Jun. 2, 2022

(30) Foreign Application Priority Data
Mar. 19, 2019    (CN) .......................... 201910208259.8

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/483* (2013.01); *H01M 4/587* (2013.01);
(Continued)

(58) Field of Classification Search
CPC ...... H01M 4/366; H01M 4/483; H01M 4/587; H01M 10/0525; H01M 2004/021;
(Continued)

(56) References Cited

U.S. PATENT DOCUMENTS

| | | | |
|---|---|---|---|
| 2013/0168012 A1* | 7/2013 | Wang | H01M 4/663 156/247 |
| 2014/0057176 A1* | 2/2014 | Park | H01M 4/1391 429/231.8 |
| 2018/0269483 A1 | 9/2018 | Cho | |

FOREIGN PATENT DOCUMENTS

| | | |
|---|---|---|
| CN | 103346293 A | 10/2013 |
| CN | 103633306 A | 3/2014 |

(Continued)

OTHER PUBLICATIONS

PCT International Search Report mailed Apr. 26, 2020 in counterpart PCT application PCT/2020/077942 5 pages.
(Continued)

*Primary Examiner* — Daniel S Gatewood
(74) *Attorney, Agent, or Firm* — XSENSUS LLP

(57) ABSTRACT

The present application relates to an anode material, and an electrochemical device and an electronic device using the same. The anode material of the present application includes: a silicon compound $SiO_x$, where x is 0.5-1.5; an oxide $MeO_y$ layer, the $MeO_y$ layer coating at least a portion of the silicon compound $SiO_x$, where Me includes at least one of Al, Si, Ti, Mn, V, Cr, Co or Zr, where y is 0.5-3; and a carbon nanotube layer, the carbon nanotube layer coating at least a portion of the $MeO_y$ layer. The anode material can (Continued)

significantly enhance the cycle performance and rate performance of the electrochemical device, and significantly reduce the impedance of the electrochemical device.

19 Claims, 3 Drawing Sheets

(51) Int. Cl.
    *H01M 4/48*     (2010.01)
    *H01M 4/587*     (2010.01)
    *H01M 10/0525*     (2010.01)

(52) U.S. Cl.
    CPC .. *H01M 10/0525* (2013.01); *H01M 2004/021* (2013.01); *H01M 2004/027* (2013.01)

(58) Field of Classification Search
    CPC ......... H01M 2004/027; H01M 4/0471; H01M 4/139; H01M 4/386; H01M 4/62; H01M 4/625; H01M 4/131; H01M 4/624; H01M 4/628; Y02E 60/10
    See application file for complete search history.

(56) References Cited

FOREIGN PATENT DOCUMENTS

| | | |
|---|---|---|
| CN | 104638234 A | 5/2015 |
| CN | 104716312 A | 6/2015 |
| CN | 105024076 A | 11/2015 |
| CN | 105140487 A | 12/2015 |
| CN | 105742599 A * | 7/2016 |
| CN | 106159227 A | 11/2016 |
| CN | 106848199 A | 6/2017 |
| CN | 107293700 A | 10/2017 |
| CN | 107959012 A | 4/2018 |
| CN | 108630917 A | 10/2018 |
| CN | 109273680 A | 1/2019 |
| CN | 109301184 A * | 2/2019 ............ B82Y 30/00 |
| CN | 109841823 A | 6/2019 |
| WO | 2019013525 A2 | 1/2019 |

OTHER PUBLICATIONS

PCT Written Opinion mailed Apr. 26, 2020 in counterpart PCT application PCT/2020/077942, 5 pages.
"A Basic Guide to Particle Characterization", Malvern Instruments Worldwide—White Paper, p. 1-26, May 2, 2012, XP055089322, Retrieved from the Internet: URL:http://golik.co.il/Data/ABasicGuidtoParticleCharacterization(2)_1962085150.pdf [retrieved on Jan. 11, 2024].
Office Action mailed Feb. 29, 2024, in Chinese Application No. 202210482961.5, 18 pages.(with English Translation).
Supplementary Search Report mailed Jan. 30, 2024, in European Application No. 20712821.6, 10 pages.

* cited by examiner

ANODE MATERIAL, AND ELECTROCHEMICAL DEVICE AND ELECTRONIC DEVICE USING THE SAME

The present application is a National Stage application of PCT international application: PCT/CN2020/077942, filed on Mar. 5, 2020, which claims the benefit of priority from the China Patent Application No. 201910208259.8, filed on Mar. 19, 2019, and the disclosure of which is hereby incorporated by reference in its entirety.

BACKGROUND OF THE INVENTION

1. Field of the Invention

The present application relates to the field of energy storage, and in particular, to an anode material, and an electrochemical device and an electronic device using the same, particularly a lithium-ion battery.

2. Description of the Related Art

Electrochemical devices (for example, lithium-ion batteries) have entered our daily lives as advances in technology and environmental protection improve. In recent years, silicon has been considered to be the anode material of a lithium ion battery that is most likely to be applied on a large-scale because the reversible capacity of silicon is 4200 mAh/g. However, the volume expansion of silicon is about 400% during the charge/discharge process. Ultra-high volume expansion causes damage to the solid electrolyte interface film (SEI), which constantly exposes the surface of the fresh material, thereby continuously consuming the electrolytic solution and leading to repeated formation of the SEI. Although silicon-oxygen material has a certain decrease in capacity compared with pure silicon, the silicon-oxygen material can significantly reduce volume expansion to some extent. The volume expansion of silicon-oxygen material can be controlled to be only 120-160% by reasonable design of silicon-oxygen ratio and particle size and optimization of cell preparation process. However, this still cannot meet the current requirement for the high cycle life of lithium-ion batteries.

In view of this, in order to meet the requirement for high cycle life, it is necessary to further refine and improve the structure of the anode material.

SUMMARY OF THE INVENTION

Embodiments of the present application provide an anode material and a method of preparing the anode material, in an attempt to resolve at least one of the problems existing in the related art at least to some extent. Embodiments of the present application further provide a anode using the anode material, an electrochemical device and an electronic device.

In one embodiment, the present application provides an anode material, including:
  a silicon compound $SiO_x$, where x is 0.5-1.5;
  an oxide $MeO_y$ layer, wherein the oxide $MeO_y$ layer coats at least a portion of the silicon compound $SiO_x$, wherein Me includes at least one of Al, Si, Ti, Mn, V, Cr, Co or Zr, and y is 0.5-3; and
  a carbon nanotube layer, wherein the carbon nanotube layer coats at least a portion of the oxide $MeO_y$ layer.

In another embodiment, the present application provides a method for preparing an anode material, including:
  (1) forming a mixed solution of a $SiO_x$ powder and an oxide precursor $MeX_n$ in the presence of an organic solvent and deionized water;
  drying the mixed solution to obtain a powder; and
  sintering the powder at about 450-900° C. for about 0.5-24 h to obtain silicon compound $SiO_x$ particles coated with an oxide $MeO_y$ layer; and
  (2) mixing the silicon compound $SiO_x$ particles coated with the oxide $MeO_y$ layer, a carbon nanotube powder, a dispersing agent and a solvent to form a mixed solution; and
  drying the mixed solution to obtain a powder;
  where x is 0.5-1.5, and y is 0.5-3,
  where Me includes at least one of Al, Si, Ti, Mn, Cr, V, Co or Zr,
  where X includes at least one of methoxy, ethoxy, isopropoxy and halogen, and
  where n is 1, 2, 3 or 4.

In another embodiment, the present application provides an anode, including the anode material according to the present application.

In another embodiment, the present application provides an electrochemical device, including the anode according to the present application.

In another embodiment, the present application provides an electronic device, including the electrochemical device according to the present application.

Since the material would expand and shrink during the charge/discharge process, the tight coating structure can effectively alleviate structural damage during this process. On the other hand, the damage of the material will produce a fresh interface, and a large amount of SEI by-products will be generated after multiple cycles. When the interface is not bonded tightly or firmly, this by-product layer will promote and accelerate the peeling of the carbon layer, thereby accelerating the attenuation and failure of the material.

The main methods to improve the cycle performance of the silicon-oxygen material include: coating a silicon-oxygen material with carbon, disposing an intermediate gap layer in the middle of the carbon-coated silicon-oxygen material, reducing the size of a silicon-oxygen material, coating a silicon-oxygen material with polymer, coating a silicon-oxygen material with amorphous oxides. Among these coating means, the carbon-coated silicon-oxygen material has become the main application direction due to its better electronic conductivity and high stability. However, the carbon-coated silicon-oxygen material is likely to be decarburized due to repeated shearing forces during the processing of the battery electrode, which affects the coulombic efficiency, and the SEI film formation consumes the electrolytic solution. On the other hand, the expansion and contraction and cracking of silicon during multiple cycles causes the carbon layer to be easily peeled off the substrate. With the SEI being formed, the carbon layer is surrounded by by-products, thereby greatly increasing the electrochemical impedance and polarization, and affecting the cycle life. Therefore, enhancing the interfacial bonding performance between the carbon layer and the silicon-oxygen material is important for improving the cycle life and enhancing structure stability during charge and discharge.

The polymer-coated silicon-oxygen material and the amorphous oxide-coated silicon-oxygen material can effectively prevent the electrolytic solution from directly contacting the silicon-oxygen material, but the electrochemical impedance and polarization will be increased due to the poor conductivity of the polymer and the amorphous oxide, so that the silicon-oxygen material cannot effectively intercalate/deintercalate lithium, and the coating layer is easily destroyed when lithium is intercalated/deintercalated, which affects the cycle life. Therefore, while avoiding direct contact of the electrolytic solution and the silicon-oxygen material, enhancing the conductivity of the silicon-oxygen material and inhibiting the volume expansion of the silicon-oxygen material are important for improving the cycle life of the anode material and enhancing structure stability during charge and discharge.

In the anode material provided by the present application, the oxide $MeO_y$ layer is coated on the surface of the silicon compound $SiO_x$ material and forms a $MeF_z$ coating layer with the HF in the electrolytic solution, which can inhibit HF in the electrolytic solution from etching the surface of the silicon compound $SiO_x$ material. The oxide $MeO_y$ can form a $Li_mMeO_y$ ion conductor after lithium intercalation, and the $Li^+$ diffusion rate is enhanced, which can effectively improve the rate performance. In addition, Li—Al—O has a certain mechanical strength, and can effectively inhibit the volume expansion of the $SiO_x$ substrate to some extent. Moreover, the oxide $MeO_y$ layer and the silicon-oxygen material substrate can form a good connection through the chemical bond "Me-O—Si," thereby effectively enhancing the interface bonding force of the oxide $MeO_y$ layer with the substrate.

On the other hand, in the anode material provided by the present application, the carbon nanotube (CNT) layer is coated on the surface of the silicon compound $SiO_x$ material which has been coated with the metal oxide layer, and can be interwoven into a three-dimensional network porous structure on the surface of the silicon compound $SiO_x$ material. The pores can promote diffusion and migration of Li ions. In addition, the CNT has high conductivity, and the porous conductive network allows the silicon compound $SiO_x$ material to exhibit excellent rate performance. At the same time, the porous structure formed by CNT can effectively alleviate the volume expansion of the silicon-oxygen material during the charge/discharge process, and maintain the structural stability of the silicon-oxygen material.

The tight coating structure can effectively alleviate the structural damage caused by the volume expansion and contraction of the silicon compound $SiO_x$ during the charge/discharge process, and avoid generating a fresh interface. The coating layer reacts with HF, which can effectively alleviate the etching of HF generated during the cycle to the silicon compound $SiO_x$ material, and avoid the formation of excessive by-products and the damage to the material structure. The highly conductive porous coating layer facilitates the transmission of electrons and ions. The crosslinking three-dimensional network porous coating layer is advantageous for inhibiting the volume expansion of the silicon-oxygen material and maintaining the structural stability. Therefore, the structural design can significantly enhance the structural stability of the anode material during the cycle, so that the cycle life is significantly enhanced.

Additional aspects and advantages of the embodiments of the present application will be partially described or shown in the following description or interpreted by implementing the embodiments of the present application.

BRIEF DESCRIPTION OF THE DRAWINGS

The following will briefly illustrate the accompanying drawings necessary to describe the embodiments of the present application or the prior art so as to facilitate the description of the embodiments of the present application. Obviously, the accompanying drawings described below are only part of the embodiments of the present application. For those skilled in the art, the accompanying drawings of other embodiments can still be obtained according to the structures illustrated in the accompanying drawings without any creative effort.

PREFERRED EMBODIMENT OF THE PRESENT INVENTION

Figure 1:
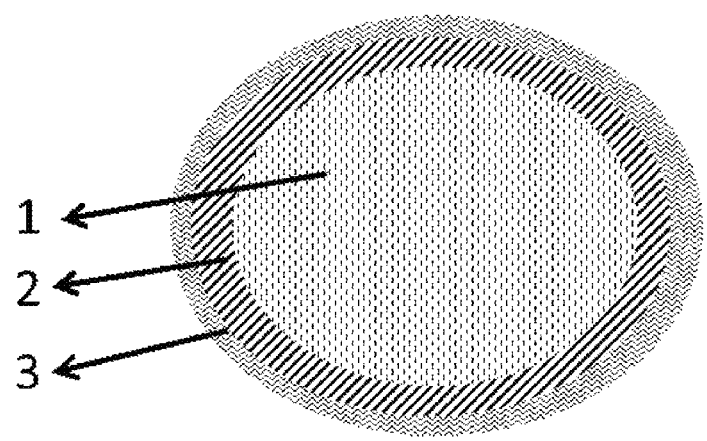
FIG. 1 is a schematic structural diagram of an anode material according to one embodiment of the present application.

Embodiments of the present application are described in detail below. The embodiments of the present application should not be construed as limiting the present application.

As used in the present application, the term "about" is used for describing and explaining minor variations. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to +0.1%, or less than or equal to ±0.05%.

In addition, amounts, ratios and other numerical values are sometimes presented herein in a range format. It should be appreciated that such range formats are for convenience and conciseness, and should be flexibly understood as comprising not only values explicitly specified to range constraints, but also all individual values or sub-ranges within the ranges, like explicitly specifying each value and each sub-range.

In the detailed description and the claims, a list of items connected by the term "one of" or similar terms may mean any of the listed items. For example, if items A and B are listed, then the phrase "one of A and B" means only A or only B. In another example, if items A, B, and C are listed, then the phrase "one of A, B and C" means only A; only B; or only C. The item A may include a single component or multiple components. The item B may include a single component or multiple components. The item C may include a single component or multiple components.

In the detailed description and the claims, a list of items connected by the term "at least one of" or similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C;

A and B (excluding C); A and C (excluding B); B and C (excluding A); or all of A, B and C. The item A may include a single component or multiple components. The item B may include a single component or multiple components. The item C may include a single component or multiple components.

I. Anode Material

Embodiments of the present application provide an anode material, including:

a silicon compound $SiO_x$, where x is 0.5-1.5;

an oxide $MeO_y$ layer, wherein the oxide $MeO_y$ layer coats at least a portion of the silicon compound $SiO_x$, wherein Me includes at least one of Al, Si, Ti, Mn, V, Cr, Co or Zr, and y being 0.5-3; and a carbon nanotube layer, wherein the carbon nanotube layer coats at least a portion of the oxide $MeO_y$ layer.

In some embodiments, the silicon compound $SiO_x$ includes a crystalline silicon compound $SiO_x$, an amorphous silicon compound $SiO_x$ or a combination thereof.

In some embodiments, the silicon compound $SiO_x$ includes SiO, $SiO_2$ or a combination thereof.

In some embodiments, the anode material includes nano Si crystalline grains.

In some embodiments, the size of the nano Si crystalline grains is about 0.5 nm-100 nm. In some embodiments, the size of the nano Si crystalline grains is about 0.5 nm-50 nm.

In some embodiments, the size of the nano Si crystalline grains is about 0.5 nm-20 nm. In some embodiments, the size of the nano Si crystalline grains is about 0.5 nm-10 nm. In some embodiments, the size of the nano Si crystalline grains is about 0.5 nm-5 nm.

In some embodiments, the oxide $MeO_y$ layer includes a crystalline $MeO_y$, an amorphous $MeO_y$ or a combination thereof.

In some embodiments, the average particle diameter of the silicon compound $SiO_x$ is about 500 nm-30 μm. In some embodiments, the average particle diameter of the silicon compound $SiO_x$ is about 1 μm-20 μm. In some embodiments, the average particle diameter of the silicon compound $SiO_x$ is about 5 μm-10 μm.

In some embodiments, the thickness of the oxide $MeO_y$ layer is about 1 nm-1000 nm. In some embodiments, the thickness of the oxide $MeO_y$ layer is about 1 nm-500 nm. In some embodiments, the thickness of the oxide $MeO_y$ layer is about 1 nm-50 nm.

In some embodiments, the carbon nanotubes include single-walled carbon nanotubes, multi-walled carbon nanotubes or a combination thereof.

In some embodiments, the diameter of the carbon nanotubes is about 2-30 nm. In some embodiments, the diameter of the carbon nanotubes is about 2-20 nm. In some embodiments, the diameter of the carbon nanotubes is about 2-10 nm.

In some embodiments, the carbon nanotubes have a length-to-diameter ratio in the range of about 50-3000. In some embodiments, the carbon nanotubes have a length-to-diameter ratio in the range of about 200-3000. In some embodiments, the carbon nanotubes have a length-to-diameter ratio in the range of about 1000-3000.

In some embodiments, the content of the carbon nanotubes is about 0.1 wt %-10 wt % based on the total weight of the anode material. In some embodiments, the content of the carbon nanotubes is about 0.2 wt %-8 wt % based on the total weight of the anode material.

In some embodiments, the content of the carbon nanotubes is about 0.2 wt %-6 wt % based on the total weight of the anode material.

In some embodiments, the content of the carbon nanotubes is about 0.5 wt %, about 2 wt % or about 5 wt % based on the total weight of the anode material.

In some embodiments, the specific surface area of the anode material is about 1-50 $m^2/g$. In some embodiments, the specific surface area of the anode material is about 1-30 $m^2/g$. In some embodiments, the specific surface area of the anode material is about 1-20 $m^2/g$.

In some embodiments, the anode material further includes a carbon layer. In some embodiments, the carbon layer is coated on the carbon nanotube layer. In some embodiments, the carbon layer is located between the oxide $MeO_y$ layer and the carbon nanotube layer. In some embodiments, the carbon layer is located between the silicon compound $SiO_x$ and the carbon nanotube layer.

In some embodiments, the carbon layer is obtained by sintering an organic carbon precursor.

FIG. 1 is a schematic structural diagram of an anode material according to one embodiment of the present application. The inner layer 1 is a silicon-oxygen material, the intermediate layer 2 is an oxide layer, and the outer layer 3 is a carbon nanotube layer.

Figure 2:
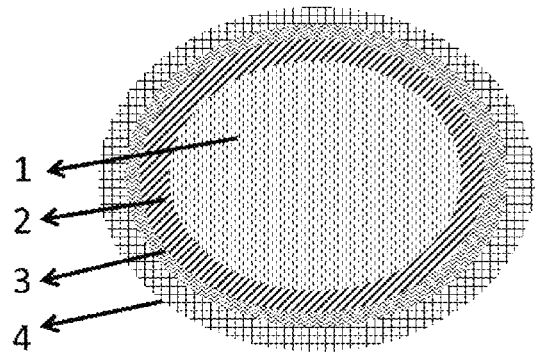
FIG. 2 is a schematic structural diagram of an anode material according to another embodiment of the present application.

FIG. 2 is a schematic structural diagram of an anode material according to another embodiment of the present application. The inner layer 1 is a silicon-oxygen material, the intermediate layer 2 is an oxide layer, the intermediate layer 3 is a carbon nanotube layer, and the outer layer 4 is a carbon layer obtained by sintering an organic carbon precursor.

Figure 3:
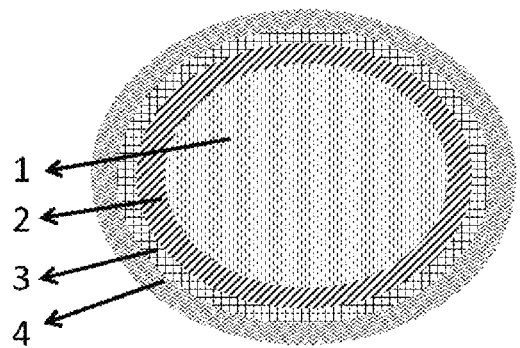
FIG. 3 is a schematic structural diagram of an anode material according to another embodiment of the present application.

FIG. 3 is a schematic structural diagram of an anode material according to another embodiment of the present application. The inner layer 1 is a silicon-oxygen material, the intermediate layer 2 is an oxide layer, the intermediate layer 3 is a carbon layer obtained by sintering an organic carbon precursor, and the outer layer 4 is a carbon nanotube layer.

II. Preparation Method of an Anode Material

Embodiments of the present application provide a method for preparing any of the above anode materials, including:

(1) forming a mixed solution of a $SiO_x$ powder and an oxide precursor $MeX_n$ in the presence of an organic solvent and deionized water;

drying the mixed solution to obtain a powder; and sintering the powder at 450-900° C. for 0.5-24 h to obtain silicon compound $SiO_x$ particles coated with an oxide $MeO_y$ layer; and (2) mixing the silicon compound $SiO_x$ particles coated with the oxide $MeO_y$ layer, a carbon nanotube powder, a dispersing agent and a solvent to form a mixed solution; and drying the mixed solution to obtain a powder;

where x is 0.5-1.5, and y is 0.5-3, where Me includes at least one of Al, Si, Ti, Mn, Cr, V, Co or Zr, where X includes at least one of methoxy, ethoxy, isopropoxy and halogen, and where n is 1, 2, 3 or 4.

In some embodiments, the oxide precursor $MeX_n$ includes isopropyl titanate, aluminum isopropoxide or a combination thereof.

In some embodiments, the sintering temperature in step (1) is about 300-800° C. In some embodiments, the sintering temperature in step (1) is about 400-700° C. In some embodiments, the sintering temperature in step (1) is about 400-650° C. In some embodiments, the sintering temperature in step (1) is about 600° C.

In some embodiments, the sintering time in step (1) is about 1-20 h. In some embodiments, the sintering time in step (1) is about 1-15 h. In some embodiments, the sintering time in step (1) is about 1-10 h. In some embodiments, the sintering time in step (1) is about 1.5-5 h. In some embodiments, the sintering time in step (1) is about 2 h, 3 h or 4 h.

In some embodiments, the organic solvent includes at least one of the following solvents: ethanol, methanol, n-hexane, N,N-dimethylformamide, pyrrolidone, acetone, toluene, isopropanol or n-propanol. In some embodiments, the organic solvent is ethanol.

In some embodiments, the dispersing agent includes at least one of the following dispersing agents: carboxymethylcellulose sodium, polyvinylpyrrolidone, polyvinyl alcohol or polyacrylic acid. In some embodiments, the dispersing agent is carboxymethylcellulose sodium.

In some embodiments, the halogen includes F, Cl, Br, or a combination thereof.

In some embodiments, the sintering in step (1) is performed under the protection of an inert gas. In some embodiments, the inert gas includes nitrogen, argon, or a combination thereof.

In some embodiments, the drying in step (1) and step (2) is spray drying at a drying temperature of about 100-300° C.

In some embodiments, the method optionally includes the step of coating a carbon layer on the surface of the carbon nanotube layer. In some embodiments, the step of coating a carbon layer on the surface of the carbon nanotube layer includes:
 (a) forming a mixed solution of the anode material obtained above and an organic carbon precursor in the presence of an organic solvent; drying the mixed solution to obtain a powder; and
 (b) sintering the powder, crushing, and passing through a 400 mesh sieve to obtain an anode material having a carbon layer coating the surface of the carbon nanotubes.

In some embodiments, the organic carbon precursor includes one or more of the following organic carbon precursors: a phenolic resin, a polyester resin, a polyamide resin, an epoxy resin, a polyurethane, a polyacrylic resin or pitch. In some embodiments, the organic carbon precursor is a phenolic resin.

In some embodiments, the sintering temperature in step (b) is about 400-1100° C. In some embodiments, the sintering temperature in step (b) is about 600-1000° C. In some embodiments, the sintering temperature in step (b) is about 700-900° C.

In some embodiments, the sintering time in step (b) is about 1-20 h. In some embodiments, the sintering time in step (b) is about 1-15 h. In some embodiments, the sintering time in step (b) is about 1-10 h. In some embodiments, the sintering time in step (b) is about 1-6 h.

In some embodiments, the organic solvent used in this step is the same as the organic solvent described above.

In some embodiments, the method optionally includes the step of coating a carbon layer on the surface of the oxide $MeO_y$ layer before coating the carbon nanotube layer. In some embodiments, the step of coating a carbon layer on the surface of the oxide $MeO_y$ layer is similar to the step of coating a carbon layer on the surface of the carbon nanotube layer, except that the carbon layer is coated on the surface of the oxide $MeO_y$ layer after the oxide $MeO_y$ layer is coated on the surface of the silicon compound $SiO_x$, and after the carbon layer coating is completed, the carbon nanotube layer is coated on the surface of the carbon layer. Since the oxide $MeO_y$ layer is coated on at least a portion of the silicon compound $SiO_x$, the above carbon layer may be directly coated on the surface of the silicon compound $SiO_x$.

III. Anode

Embodiments of the present application provide an anode. The anode includes a current collector and an anode active material layer located on the current collector. The anode active material layer includes the anode material according to the embodiments of the present application.

In some embodiments, the anode active material layer includes a binder. In some embodiments, the binder includes, but is not limited to, polyvinyl alcohol, carboxymethyl cellulose, hydroxypropyl cellulose, diacetyl cellulose, polyvinyl chloride, carboxylated polyvinyl chloride, polyvinyl fluoride, ethylene oxide containing polymers, polyvinylpyrrolidone, polyurethane, polytetrafluoroethylene, poly(1,1-difluoroethylene), polyethylene, polypropylene, styrene-butadiene rubber, acrylated styrene-butadiene rubber, epoxy resin or nylon.

In some embodiments, the anode active material layer includes a conductive material.

In some embodiments, the conductive material includes, but is not limited to, natural graphite, artificial graphite, carbon black, acetylene black, Ketjen black, carbon fibers, metal powder, metal fibers, copper, nickel, aluminum, silver or a polyphenylene derivative.

In some embodiments, the current collector includes, but is not limited to, copper foil, nickel foil, stainless steel foil, titanium foil, nickel foam, copper foam, or a polymer substrate coated with a conductive metal.

In some embodiments, the anode may be obtained by the following method: mixing an active material, a conductive material and a binder in a solvent to prepare an active material composition, and coating the active material composition on a current collector.

In some embodiments, the solvent may include, but is not limited to, N-methylpyrrolidone.

IV. Cathode

A material capable of being applied to a cathode in the embodiment of the present application, a constitution and a manufacturing method thereof that includes any technologies disclosed in the prior art. In some embodiments, the cathode is a cathode disclosed in the U.S. Pat. No. 9,812,739B, which is incorporated into the present application by full text reference.

In some embodiments, the cathode includes a current collector and a cathode active material layer on the current collector.

In some embodiments, the cathode active material includes, but is not limited to, lithium cobalt oxide ($LiCoO_2$), a lithium nickel cobalt manganese (NCM) ternary material, lithium iron phosphate ($LiFePO_4$) or lithium manganate ($LiMn_2O_4$).

In some embodiments, the cathode active material layer further includes a binder, and optionally further includes a conductive material. The binder improves the binding of the cathode active material particles to each other, and also improves the binding of the cathode active material to the current collector.

In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, ethylene oxide containing polymers, polyvinylpyrrolidone, polyurethane, polytetrafluoroethylene, poly(1,1-difluoroethylene), polyethylene, polypropylene, styrene-butadiene rubber, acrylated styrene-butadiene rubber, epoxy resin and nylon.

In some embodiments, the conductive material includes, but is not limited to, a carbon-based material, a metal-based material, a conductive polymer and a mixture thereof. In some embodiments, the carbon-based material is selected from natural graphite, artificial graphite, carbon black, acetylene black, Ketjen black, carbon fiber or any combination thereof. In some embodiments, the metal based material is selected from metal powder, metal fibers, copper, nickel, aluminum or silver. In some embodiments, the conductive polymer is a polyphenylene derivative.

In some embodiments, the current collector may include, but is not limited to, aluminum.

The cathode may be prepared by a preparation method known in the art. For example, the cathode may be obtained by the following method: mixing an active material, a conductive material and a binder in a solvent to prepare an active material composition, and coating the active material composition on a current collector. In some embodiments, the solvent may include, but is not limited to, N-methylpyrrolidone.

V. Electrolytic Solution

An electrolytic solution capable of being used in the embodiment of the present application may be an electrolytic solution known in the prior art.

In some embodiments, the electrolytic solution includes an organic solvent, a lithium salt and an additive. The organic solvent of the electrolytic solution according to the present application may be any organic solvent known in the prior art as a solvent for the electrolytic solution. The electrolyte used in the electrolytic solution of the present application is not limited, and may be any electrolyte known in the prior art. The additive of the electrolytic solution according to the present application may be any additive known in the prior art as an additive for the electrolytic solution.

In some embodiments, the organic solvent includes, but is not limited to, ethylene carbonate (EC), propylene carbonate (PC), diethyl carbonate (DEC), ethyl methyl carbonate (EMC), dimethyl carbonate (DMC), propylene carbonate or ethyl propionate.

In some embodiments, the lithium salt includes at least one of an organic lithium salt or an inorganic lithium salt.

In some embodiments, the lithium salt includes, but is not limited to, lithium hexafluorophosphate ($LiPF_6$), lithium tetrafluoroborate ($LiBF_4$), lithium difluorophosphate ($LiPO_2F_2$), lithium bis(trifluoromethanesulfonyl)imide LiN$(CF_3SO_2)_2$ (LiTFSI), lithium bis(fluorosulfonyl)imide Li(N$(SO_2F)_2$) (LiFSI), lithium bis(oxalato)borate $LiB(C_2O_4)_2$ (LiBOB) or lithium difluoro(oxalato)borate $LiBF_2(C_2O_4)$ (LiDFOB).

In some embodiments, the concentration of the lithium salt in the electrolytic solution is: about 0.5-3 mol/L, about 0.5-2 mol/L or about 0.8-1.5 mol/L.

VI. Separator

In some embodiments, a separator is arranged between the cathode and the anode to prevent short circuit. There are no special limitations to the material and the shape of the separator used in the embodiment of the present application, and the separator may be any technologies disclosed in the prior art. In some embodiments, the separator includes a polymer or an inorganic substance formed by a material stable in the electrolytic solution of the present application.

For example, the separator may include a substrate layer and a surface treatment layer. The substrate layer is a nonwoven fabric, a film or a composite film having a porous structure, and the material of the substrate layer is at least one selected from polyethylene, polypropylene, polyethylene terephthalate and polyimide. Specifically, a polypropylene porous film, a polyethylene porous film, polypropylene nonwoven cloth, polyethylene nonwoven cloth or a polypropylene-polyethylene-polypropylene porous composite film can be adopted.

At least one surface of the substrate layer is provided with the surface treatment layer, and the surface treatment layer may be a polymer layer or an inorganic substance layer, or may be a layer formed by mixing a polymer and an inorganic substance.

The inorganic substance layer includes inorganic particles and a binder, and the inorganic particles are selected from one or a combination of several of aluminum oxide, silicon oxide, magnesium oxide, titanium oxide, hafnium oxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide and barium sulfate. The binder is selected from one or a combination of several of polyvinylidene fluoride, vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene and polyhexafluoropropylene.

The polymer layer includes a polymer, and the material of the polymer is selected from at least one of polyamide, polyacrylonitrile, acrylate polymer, polyacrylic acid, polyacrylate, polyvinylpyrrolidone, polyvinyl ether, polyvinylidene fluoride or poly(vinylidene fluoride-hexafluoropropylene).

VII. Electrochemical Device

Embodiments of the present application provide an electrochemical device, including any device that undergoes an electrochemical reaction.

In some embodiments, the electrochemical device of the present application includes a cathode having a cathode active substance capable of occluding and releasing metal ions; an anode according to the embodiment of the present application; an electrolytic solution; and a separator arranged between the cathode and the anode.

In some embodiments, the electrochemical device of the present application includes, but is not limited to, all types of primary batteries, secondary batteries, fuel cells, solar cells or capacitors.

In some embodiments, the electrochemical device is a lithium secondary battery.

In some embodiments, the lithium secondary battery includes, but is not limited to, a lithium metal secondary battery, a lithium-ion secondary battery, a lithium polymer secondary battery or a lithium-ion polymer secondary battery.

VIII. Electronic Device

The electronic device of the present application may be any device that uses the electrochemical device according to the embodiments of the present application.

In some embodiments, the electronic device includes, but is not limited to, a notebook computer, a pen input computer, a mobile computer, an e-book player, a portable phone, a portable fax machine, a portable copy machine, a portable printer, stereo headphones, a video recorder, a liquid crystal display television, a portable cleaner, a portable CD player, a mini disk player, a transceiver, an electronic notebook, a calculator, a memory card, a portable recorder, a radio, a backup power supply, a motor, a car, a motorcycle, a power bicycle, a bicycle, a lighting fixture, a toy, a game console, a clock, an electric tool, a flash lamp, a camera, a large household battery and a lithium-ion capacitor.

Hereinafter, the lithium-ion battery is taken as an example and the preparation of the lithium-ion battery is described in conjunction with a specific embodiment. Those skilled in the art would understand that the preparation method described in the present application is merely an example, and any other suitable preparation methods fall within the scope of the present application.

EMBODIMENTS

The following describes embodiments of the lithium-ion battery according to the present application and comparative examples for performance evaluation.

1. Preparation of Anode Material
   A. The anode materials of Embodiments 1-6 were prepared according to the following method:
   (1) dispersing about 100 g of silicon monoxide (SiO) powder in about 300 ml of organic solvent ethanol, and stirring for about 0.5-1 h until a uniform suspension was formed;
   (2) adding about 0.5-10 g of the oxide precursor $MeX_n$ to the above suspension, stirring for about 0.5-1 h until a uniform mixed solution was formed, dropwise adding deionized water to the mixed solution, the weight of the deionized water being about 3 times the weight of the precursor $MeX_n$, and after completing the dropwise addition, continuing the reaction for about 4 h to obtain a mixed solution;
   (3) spray drying (inlet temperature: about 220° C., outlet temperature: about 120° C.) the mixed solution obtained above to obtain a powder, sintering the powder at about 450-900° C., crushing, and passing through a 400 mesh sieve to obtain an oxide layer-coated silicon-oxygen material powder;
   (4) adding about 0.5 g-15 g of carbon nanotube powder to an aqueous solution containing the dispersing agent carboxymethylcellulose sodium, the carbon nanotube powder having the same weight as the dispersing agent, and dispersing for about 1-3 h to obtain a CNT conductive slurry;
   (5) adding the oxide layer-coated silicon-oxygen material powder prepared in step (3) to the CNT conductive slurry prepared in step (4), dispersing for about 2-4 h until a uniform mixed solution was formed, spray drying to obtain a powder, crushing, and passing through a 400-mesh sieve to obtain the anode material.
   B. The anode material of Embodiment 8 was prepared according to the following method:
   (1) dispersing about 0.5 g of an organic carbon precursor phenolic resin in about 300 ml of organic solvent ethanol, and stirring to obtain a uniform mixed solution;
   (2) adding about 101 g of the anode material prepared in Embodiment 2 to the above mixed solution, stirring to obtain a uniform slurry, and drying the slurry to obtain a powder;
   (3) in a nitrogen atmosphere, sintering at about 900° C. for about 4 h, crushing, and passing through a 400 mesh sieve to obtain the anode material of Embodiment 8.
   C. The anode material of Embodiment 7 was obtained by directly coating a carbon layer on the surface of the silicon monoxide powder and coating the carbon nanotube layer on the surface of the carbon layer. The step of coating the carbon layer was similar to the step of coating the carbon layer in Embodiment 8 above. The step of coating the carbon nanotube layer was similar to the step of coating the carbon nanotube layer in Embodiments 1-6 above.
   D. The preparation methods of the anode materials of Comparative Examples 1 and 2 were similar to those of the anode materials of Embodiments 1-6, except that the preparation methods of Comparative Examples 1 and 2 did not include the step of coating the carbon nanotube layer.
   E. The preparation methods of the anode materials of Comparative Examples 3 and 4 were similar to those of the anode materials of Embodiments 1-6, except that the preparation methods of the anode materials of Comparative Examples 3 and 4 did not sinter the powder obtained in step (3), and Comparative Example 4 did not coat the carbon nanotube layer.
   F. The preparation method of the anode material of Comparative Example 5 was similar to the preparation methods of the anode materials of Embodiments 1-6, except that the surface of the silicon monoxide powder in the anode material of Comparative Example 5 was not coated with an oxide layer, but the surface of the silicon monoxide powder was directly coated with the carbon nanotube layer to obtain the anode material.
   G. The anode material of Comparative Example 6 was obtained by directly coating a carbon layer on the surface of the oxide layer of the anode material of Comparative Example 1. The step of coating the carbon layer was similar to the step of coating the carbon layer in Embodiment 8 above.

The materials and process conditions used in various steps of various embodiments and comparative examples are listed in Table 1. The carbon layers obtained by sintering the organic carbon precursors in Embodiments 7 and 8 and Comparative Example 6 were tested to have a weight of 0.5 g.

TABLE 1

| No. | Silicon Monoxide Material | Oxide Precursor | First Sintering Process | Carbon Nanotubes | Organic Carbon Precursor |
|---|---|---|---|---|---|
| Embodiment 1 | 100 g | 0.5 g aluminum iso-propoxide | $N_2$ flow rate: 1.5 L/min, heating at 3° C./min to 600° C., holding for 2 h | 0.5 g | — |
| Embodiment 2 | 100 g | 1 g aluminum iso-propoxide | $N_2$ flow rate: 1.5 L/min, heating at 3° C./min to 600° C., holding for 2 h | 0.5 g | — |
| Embodiment 3 | 100 g | 10 g aluminum iso-propoxide | $N_2$ flow rate: 1.5 L/min, heating at 3° C./min to 600° C., holding for 2 h | 0.5 g | — |
| Embodiment 4 | 100 g | 1 g isopropyl titanate | $N_2$ flow rate: 1.5 L/min, heating at 3° C./min to 600° C., holding for 2 h | 0.5 g | — |
| Embodiment 5 | 100 g | 1 g aluminum iso-propoxide | $N_2$ flow rate: 1.5 L/min, heating at 3° C./min to 600° C., holding for 2 h | 2 g | — |
| Embodiment 6 | 100 g | 1 g aluminum iso-propoxide | $N_2$ flow rate: 1.5 L/min, heating at 3° C./min to 600° C., holding for 2 h | 5 g | — |

TABLE 1-continued

| No. | Silicon Monoxide Material | Oxide Precursor | First Sintering Process | Carbon Nano-tubes | Organic Carbon Precursor |
|---|---|---|---|---|---|
| Embodiment 7 | 100 g | — | $N_2$ flow rate: 1.5 L/min, heating at 3° C./min to 600° C., holding for 2 h | 0.5 g | 1 g phenolic resin |
| Embodiment 8 | 100 g | 1 g aluminum iso-propoxide | $N_2$ flow rate: 1.5 L/min, heating at 3° C./min to 600° C., holding for 2 h | 0.5 g | 1 g phenolic resin |
| Comparative Example 1 | 100 g | 1 g aluminum iso-propoxide | $N_2$ flow rate: 1.5 L/min, heating at 3° C./min to 600° C., holding for 2 h | — | — |
| Comparative Example 2 | 100 g | 1 g isopropyl titanate | $N_2$ flow rate: 1.5 L/min, heating at 3° C./min to 600° C., holding for 2 h | — | — |
| Comparative Example 3 | 100 g | 1 g aluminum iso-propoxide | — | 0.5 g | — |
| Comparative Example 4 | 100 g | 1 g aluminum iso-propoxide | — | — | — |
| Comparative Example 5 | 100 g | — | — | 0.5 g | — |
| Comparative Example 6 | 100 g | 1 g aluminum iso-propoxide | $N_2$ flow rate: 1.5 L/min, heating at 3° C./min to 600° C., holding for 2 h | — | 1 g phenolic resin |

"—" means that the substance was not added or sintering was not performed.

2. The powder properties of the anode materials obtained in Embodiments 1-8 and Comparative Examples 1-6 were tested, where the powder property test method was as follows:
  (1) Observation of microscopic morphology of powder particles: The microscopic morphology of the powder was observed by a scanning electron microscope to characterize the surface coating of the material. The selected test instrument was: OXFORD EDS (X-max-20 mm²), the accelerating voltage was 15 KV, the focal length was adjusted, high-magnification observation was performed from the observation magnification of 50 K, and the particle agglomeration was mainly observed at a low magnification of 500-2000.
  (2) Specific surface area test: After measuring the adsorption amount of gas on the solid surface under different relative pressures at constant temperature and low temperature, the monomolecular adsorption amount of the test sample was obtained based on the Brunauer-Emmett-Teller adsorption theory and the theory formula (BET formula), thereby calculating the specific surface area of the solid.
About 1.5-3.5 g of the powder sample was weighed and placed into a TriStar II 3020 test sample tube and tested after degassing at about 200° C. for 120 min.
  (3) Particle size test: about 0.02 g of powder sample was added to a 50 ml clean beaker, about 20 ml of deionized water was added, a few drops of 1% surfactant was added to completely disperse the powder in water, ultrasonic treatment was performed in a 120 W ultrasonic cleaning machine for 5 minutes, and the particle size distribution was tested using MasterSizer 2000.
  (4) Tap density: By using GB/T 5162-2006 *Determination of Tap Density of Metal Powder*, the mass M g of a clean and dry 100 cm³ three-sided scale (scale spacing of 1 cm³, measurement accuracy of ±0.5 cm³) cylinder was weighed, a certain mass of powder sample was added such that the scale of the powder sample was at the ½-⅔ range, and the cylinder opening was sealed with a sealing film. The cylinder with the powder was placed on a mechanical vibration device, and vibrated at 100-300 times/min for 5000 times, and the tap density was obtained according to the mass/volume after vibration.
  (5) Carbon content test: The sample was subjected to high-temperature heating and burnt in a high frequency furnace under oxygen-rich conditions to respectively oxidize carbon and sulfur into carbon dioxide and sulfur dioxide. The gas was treated and entered the corresponding absorption cell. The corresponding infrared radiation was absorbed and converted into a corresponding signal by a detector. The signal was sampled by a computer, and linearly corrected and converted to a value directly proportional to the concentration of carbon dioxide and sulfur dioxide, and then the value of the entire analysis process was accumulated. After the analysis was finished, the accumulated value was divided by the weight value in the computer, and multiplied by the correction factor, and after subtracting the blank, the percentage of the carbon and sulfur in the sample was obtained. The sample was tested using a high-frequency infrared carbon sulfur analyzer (Shanghai Dekai HCS-140).
  (6) Powder electronic conductivity test: By using a four-wire two-terminal method, the steady mass resistance was determined by measuring the voltage across the resistor to be tested and the current flowing through the resistor, and the conductivity was calculated in combination with the height and the bottom area of the resistor to be tested. A certain amount of powder was added to the test mold, and after gently leveling, the gasket on the mold was placed on the sample. After the sample loading was completed, the mold was placed on the worktable of the electronic pressure tester, and the pressure was raised to 500 kg (159 Mpa) at a rate of 5 mm/min, maintained constant for 60 s, and then relieved to 0. When the sample was subjected to constant pressure to 5000±2 kg (about 15-25 s after the pressure reached 5000 kg), the sample pressure is recorded, and the deformation height of the sample was read. The value displayed by the resistance tester at this time was recorded, and the electronic conductivity can be calculated using the formula.

3. The anode materials obtained in Embodiments 1-8 and Comparative Examples 1-6 were subjected to an electrical performance test, where the electrical performance test method was as follows:
The anode material obtained in Embodiments 1-8 and Comparative Examples 1-6, conductive carbon black and a binder sodium polyacrylate (PAANa) were mixed according to a weight ratio of about 80:10:10, deionized water was added and stirred to obtain a slurry. A coating having the thickness of about 100 μm was applied by a scraper, dried in a vacuum drying oven at about 85° C. for about 12 hours, and cut into a disk having the diameter of about 1 cm by a punch in a dry environment. In a glove box, a lithium metal plate was used as a counter electrode, a ceglard composite film was selected as the separator, and the electrolytic solution (the weight ratio of EC to DEC was about 3:7, the concentration of lithium hexafluorophosphate was about 1 M, and the weight percentage of the FEC in the electrolytic solution was about 5 wt %) was added to assemble a button battery. The battery was subjected to a charge/discharge test using a LAND series battery test to test the charge/discharge performance of the battery.

The results of the powder property and electrical performance tests on the anode materials obtained in Embodiments 1-8 and Comparative Examples 1-6 were listed in Table 2.

DEC was about 3:7, the concentration of lithium hexafluorophosphate was about 1 M, and the weight percentage of FEC in the electrolytic solution was about 5 wt %) was injected and packaged. The battery was obtained after formation, degassing, trimming and other processes.

(2) High-temperature cycle test: At a test temperature of 45° C., the battery was charged at a constant current of 0.7 C to 4.4 V, charged at a constant voltage to 0.025 C, allowed to stand for 5 minutes, and discharged at 0.5 C to 3.0 V. Taking the capacity obtained above as the initial capacity, a 0.7 C charge/0.5 C discharge cycle test was performed, and the ratio of the capacity of each step to the initial capacity was taken to obtain the capacity attenuation curve.

TABLE 2

| No. | Specific Surface Area ($m^2/g$) | Particle Size Range ($\mu m$) | Carbon Content (wt %) | Powder Electronic Conductivity ($\mu S/cm$) | First Reversible Capacity mAh/g (0.005 V-0.8 V) | First Efficiency |
|---|---|---|---|---|---|---|
| Embodiment 1 | 5.6 | 3.0-33 | 0.84 | $3.9 \times 10^7$ | 1355 | 68.5% |
| Embodiment 2 | 5.8 | 3.2-35 | 0.81 | $1.8 \times 10^7$ | 1312 | 67.1% |
| Embodiment 3 | 6.7 | 3.5-38 | 0.75 | $6.3 \times 10^6$ | 1109 | 50.3% |
| Embodiment 4 | 5.4 | 2.9-32 | 0.82 | $2.1 \times 10^7$ | 1361 | 68.7% |
| Embodiment 5 | 8.7 | 3.6-40 | 3.50 | $5.4 \times 10^8$ | 1298 | 66.4% |
| Embodiment 6 | 12.6 | 4.0-45 | 6.87 | $7.5 \times 10^9$ | 1251 | 63.1% |
| Embodiment 7 | 7.2 | 2.6-45 | 1.44 | $6.0 \times 10^7$ | 1332 | 67.4% |
| Embodiment 8 | 10.3 | 3.1-50 | 1.31 | $4.5 \times 10^7$ | 1301 | 66.7% |
| Comparative Example 1 | 4.2 | 2.2-14 | 0.05 | $3.1 \times 10^3$ | 1333 | 69.7% |
| Comparative Example 2 | 4.1 | 2.3-15 | 0.07 | $4.2 \times 10^3$ | 1336 | 70.0% |
| Comparative Example 3 | 5.5 | 2.8-32 | 0.78 | $1.1 \times 10^7$ | 1315 | 68.7% |
| Comparative Example 4 | 4.3 | 2.2-13 | 0.07 | $8.5 \times 10^2$ | 1342 | 69.7% |
| Comparative Example 5 | 5.3 | 2.9-32 | 0.80 | $4.5 \times 10^7$ | 1377 | 71.2% |
| Comparative Example 6 | 6.0 | 3.5-37 | 0.87 | $9.8 \times 10^6$ | 1341 | 68.0% |

The first efficiency in the table was calculated by capacity at a charge voltage of up to 0.8 V/capacity at a discharge voltage of up to 0.005 V.

4. The performance of the anode materials obtained in Embodiments 1-8 and Comparative Examples 1-6 was subjected to full battery evaluation:

(1) Preparation of battery

An active material $LiCoO_2$, conductive carbon black and a binder polyvinylidene fluoride (PVDF) were sufficiently stirred and uniformly mixed according to a weight ratio of about 96.7:1.7:1.6 in an N-methylpyrrolidone solvent system, coated on an Al foil, dried, and cold-pressed to obtain a cathode.

The graphite was respectively mixed with the anode materials obtained in Embodiments 1-8 and Comparative Examples 1-6 according to a certain weight ratio to obtain a mixed powder having the capacity per gram of 430 mAh/g. The mixed powder, a conductive agent acetylene black and sodium polyacrylate PAANa were sufficiently stirred in deionized water according to a weight ratio of about 95:1.2:3.8, uniformly mixed, then coated on a Cu foil, dried and cold-pressed to obtain an anode.

A PE porous polymer film was used as a separator. The cathode, the separator and the anode were stacked in order such that the separator was between the cathode and anode to play a role of isolation, and were wound to obtain bare cell. The bare cell was placed in an outer package, and the prepared electrolytic solution (the weight ratio of EC to (3) Fully-charged battery expansion rate test: The thickness of a half-charged (50% state of charge (SOC)) fresh battery was tested by a screw micrometer. After 400 cycles, the thickness of the battery in a fully-charged (100% SOC) state at this time was tested by the screw micrometer again, and compared to the thickness of the initial half-charged (50% SOC) fresh battery to obtain the expansion ratio of the fully-charged (100% SOC) battery at this time.

(4) Discharge rate test: At 25° C., the battery was discharged at 0.2 C to 3.0 V, allowed to stand for 5 min, charged at 0.5 C to 4.4 V, charged at constant voltage to 0.05 C and allowed to stand for 5 minutes, the discharge rate was adjusted, and a discharge test was performed respectively at 0.2 C, 0.5 C, 1 C, 1.5 C and 2.0 C to respectively obtain the discharge capacity. The capacity obtained at each rate was compared with the capacity obtained at 0.2 C to obtain a ratio, and the ratio performance was compared by comparing the ratios.

(5) DC internal resistance (DCR) test: The actual capacity of the battery at 25° C. was tested by a Maccor machine (0.7 C constant current charging to 4.4 V, constant voltage charging to 0.025 C, standing for 10 minutes, discharging at 0.1 C to 3.0 V, and standing for 5 minutes). The battery was discharged at 0.1 C to a certain state of charge (SOC), and tested for 1 s and discharged. Points were taken in 5 ms, and the DCR value under different SOCs was calculated.

The test results are listed in Table 3.

TABLE 3

| No. | Number of Cycles When Capacity Attenuating to 80% | Fully-charged Battery Expansion Ratio After 400 Cycles | Rate (2 C discharge capacity/ 0.2 C discharge capacity) | DCR (Value at room temperature at 10% SOC, mΩ) |
|---|---|---|---|---|
| Embodiment 1 | 456 | 6.9% | 93.5% | 63 |
| Embodiment 2 | 487 | 6.7% | 92.8% | 65 |
| Embodiment 3 | 461 | 6.5% | 89.1% | 70 |
| Embodiment 4 | 490 | 6.8% | 92.7% | 65 |
| Embodiment 5 | 530 | 5.4% | 94.6% | 56 |
| Embodiment 6 | 312 | 4.7% | 87.6% | 69 |
| Embodiment 7 | 452 | 7.0% | 94.0% | 55 |
| Embodiment 8 | 513 | 6.4% | 93.7% | 57 |
| Comparative Example 1 | 390 | 8.7% | 78.5% | 74 |
| Comparative Example 2 | 386 | 8.6% | 79.1% | 73 |
| Comparative Example 3 | 453 | 6.6% | 91.9% | 66 |
| Comparative Example 4 | 367 | 8.8% | 76.3% | 75 |
| Comparative Example 5 | 320 | 9.4% | 93.0% | 58 |
| Comparative Example 6 | 448 | 7.8% | 92.1% | 67 |

The test results of Embodiment 1, Embodiment 2 and Embodiment 3 and Comparative Example 5 show that the addition of $Al_2O_3$ in the anode material can effectively improve the high-temperature cycle performance of the battery. In Embodiment 1, Embodiment 2 and Embodiment 3, by controlling the content of the alumina precursor, an $Al_2O_3$ layer having a different coating thickness can be obtained. It can be seen that with the content of the precursor increasing (i.e., the thickness of the $Al_2O_3$ layer increases), the high-temperature cycle performance of the battery first becomes better and then deteriorates, and the impedance gradually increases with the thickness increasing. Therefore, it can be seen that the content of the alumina precursor in Embodiment 2 is an optimum content.

The test results of Embodiment 2, Embodiment 5 and Embodiment 6 and Comparative Example 1 show that the addition of the CNT coating layer in the anode material can also significantly improve the high-temperature cycle performance, reduce the impedance of the battery and enhance the rate performance of the battery. By comparing Embodiment 2, Embodiment 5 and Embodiment 6, it can be seen that with the addition amount of CNT increasing, the high-temperature cycle performance of the battery becomes better first and then deteriorates, but the higher the coating amount of CNT, the more obvious the improvement effect of battery expansion. When the coating amount of CNT is too large, a large amount of electrolytic solution is consumed during the cycle, and the too thick CNT coating layer is disadvantageous for the migration of Li ions, so that the cycle performance of the battery deteriorates.

The test results of Embodiment 2 and Embodiment 4 and Comparative Example 1 and Comparative Example 2 show that in the case where the oxide precursor content is also relatively low (i.e., the thickness of the oxide layer is small), the cycle performance and rate performance of the battery with $Al_2O_3$ as the intermediate layer is similar to the cycle performance and rate performance of the battery with $TiO_2$ as the intermediate layer, and both $Al_2O_3$ and $TiO_2$ can be used as the material of the intermediate layer.

The test results of Embodiment 2 and Comparative Examples 3 and 4 show that after the oxide precursor is coated, if the anode material is not sintered, the structural stability of the anode material is reduced, as a result, the rate performance and cycle performance of the battery deteriorate. After the oxide precursor is coated, sintering the anode material can effectively improve the cycle performance of the material.

The test results of Embodiment 2 and Comparative Example 6 show that, by comparing the equivalent coating amount of CNT and amorphous carbon, the CNT can more effectively inhibit the expansion of the silicon monoxide material, thereby improving the rate performance and cycle performance of the battery.

The test results of Embodiment 2 and Embodiment 7 show that replacing the $Al_2O_3$ coating layer with the carbon layer formed by sintering the organic carbon precursor can improve the conductivity and rate performance of the battery. However, in the preparation process of the carbon coating layer, the carbon particles are easily agglomerated. It is difficult to open the agglomeration, and the interface bonding between the carbon layer and the silicon material is poor. Thus, after lithium is deintercalated from the silicon material, the carbon layer is easily broken, so the cycle performance of the battery deteriorates.

The test results of Embodiment 2 with Embodiment 8 show that, on the basis of Embodiment 2, after the carbon layer is coated on the outside of the CNT coating layer in Embodiment 8, the conductivity of the anode material and the rate performance of the battery can be effectively enhanced. At the same time, since the inside of the carbon layer is an elastic CNT coating layer, after lithium is intercalated/deintercalated from the silicon material, the carbon layer can effectively maintain a complete structure, thereby improving the cycle performance of the battery.

Figure 4A:
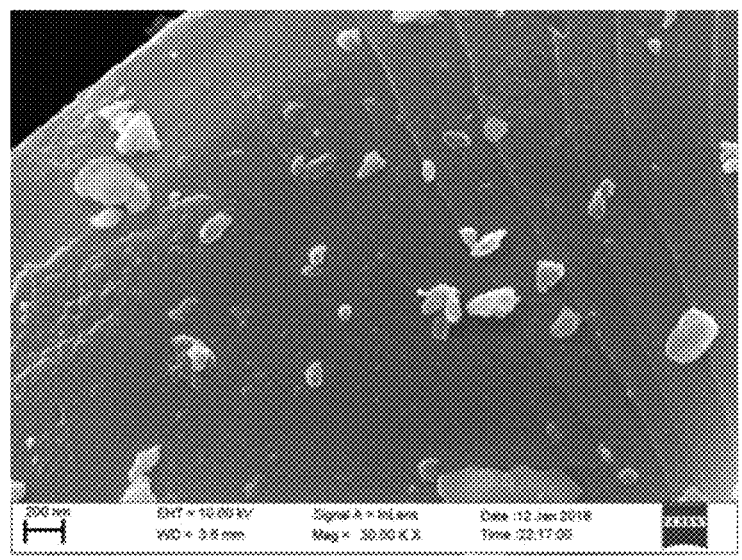
FIG. 4A is a scanning electron microscope (SEM) image of a surface of an uncoated silicon monoxide material.
Figure 4B:
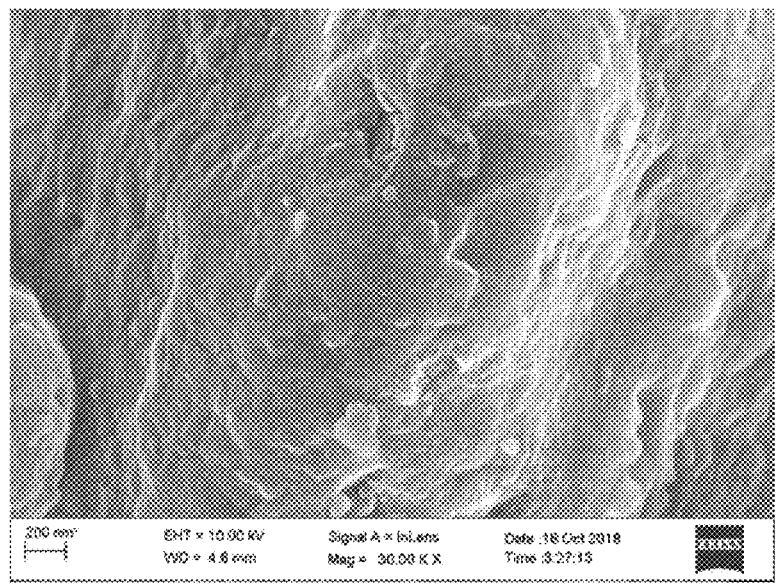
FIG. 4B is a SEM image of a surface of a silicon monoxide material coated with an oxide $Al_2O_3$ layer.
Figure 4C:
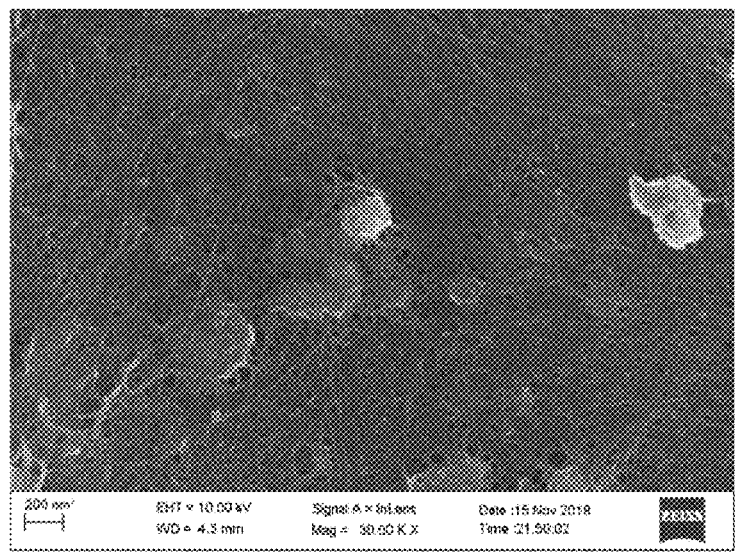
FIG. 4C is a SEM image of a surface of an anode material in Embodiment 2 of the present application.

FIG. 4A is a scanning electron microscope (SEM) image of a surface of an uncoated silicon monoxide material. FIG. 4B is a SEM image of a surface of a silicon material coated with an oxide $Al_2O_3$ layer. FIG. 4C is a SEM image of the surface of the anode material in Embodiment 2 of the present application. By comparing FIG. 4A and FIG. 4B, it can be seen that after the surface of the silicon monoxide is coated with the oxide $Al_2O_3$ layer, the surface of the particles becomes relatively rough. The material of FIG. 4C is the surface of the particles after coating the CNT coating layer on the basis of the material of FIG. 4B, and it can be seen that the CNT coating layer on the surface of the particles has a three-dimensional crosslinking porous structure.

References to "some embodiments", "part of embodiments", "one embodiment", "another example", "example", "specific example" or "part of examples" in the whole specification mean that at least one embodiment or example in the present application includes specific features, structures, materials or characteristics described in the embodiments or examples. Thus, the descriptions appear throughout the specification, such as "in some embodiments", "in an embodiment", "in one embodiment", "in another example", "in one example", "in a specific example" or "an example", which does not necessarily refer to the same embodiment or example in the present application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limiting the present application, and the embodiments can be changed, substituted and modified without departing from the spirit, principle and scope of the present application.

What is claimed is:

1. An anode material, comprising:
   a silicon compound $SiO_x$, wherein x is in a range of 0.5-1.5;
   an oxide $MeO_y$ layer, the oxide $MeO_y$ layer coating at least a portion of the silicon compound $SiO_x$, wherein Me comprises at least one of Al, Si, Ti, Mn, V, Cr, Co or Zr, wherein y is in a range of 0.5-3; and
   a carbon nanotube layer, the carbon nanotube layer coating at least a portion of the oxide $MeO_y$ layer,
   wherein the anode material further comprises a carbon layer obtained by sintering a layer of an organic carbon precursor.

2. The anode material according to claim 1, wherein the silicon compound $SiO_x$ comprises a crystalline silicon compound $SiO_x$, an amorphous silicon compound $SiO_x$ or a combination thereof.

3. The anode material according to claim 1, wherein the silicon compound $SiO_x$ comprises SiO, $SiO_2$ or a combination thereof.

4. The anode material according to claim 1, wherein the anode material comprises nano Si crystalline grains.

5. The anode material according to claim 4, wherein a size of each of the nano Si crystalline grains is in a range of about 0.5 nm-about 100 nm.

6. The anode material according to claim 1, wherein the oxide $MeO_y$ layer comprises a crystalline oxide $MeO_y$, an amorphous oxide $MeO_y$ or a combination thereof.

7. The anode material according to claim 1, wherein an average particle diameter of the silicon compound $SiO_x$ is in a range of about 500 nm-about 30 μm.

8. The anode material according to claim 1, wherein a thickness of the oxide $MeO_y$ layer is in a range of about 1 nm-about 1000 nm.

9. The anode material according to claim 1, wherein a thickness of the oxide $MeO_y$ layer is in a range of about 1 nm-about 50 nm.

10. The anode material according to claim 1, wherein the carbon nanotubes comprise single-walled carbon nanotubes, multi-walled carbon nanotubes or a combination thereof.

11. The anode material according to claim 1, wherein a diameter of the carbon nanotubes is in a range of about 2 nm-about 30 nm, and the carbon nanotubes have a length-to-diameter ratio in a range of about 50-about 3000.

12. The anode material according to claim 1, wherein a content of the carbon nanotubes is in a range of about 0.1 wt %-about 10 wt % based on the total weight of the anode material.

13. The anode material according to claim 1, wherein the carbon layer is located between the oxide $MeO_y$ layer and the carbon nanotube layer.

14. The anode material according to claim 1, wherein the carbon layer coats the carbon nanotube layer.

15. The anode material according to claim 1, wherein a thickness of the carbon layer is in a range of about 1 nm-about 100 nm.

16. The anode material according to claim 1, wherein a specific surface area of the anode material is in a range of about 1 $m^2$/g-about 50 $m^2$/g.

17. An anode, comprising an anode material, wherein the anode material comprises:
   a silicon compound $SiO_x$, wherein x is in a range of 0.5-1.5;
   an oxide $MeO_y$ layer, the oxide $MeO_y$ layer coating at least a portion of the silicon compound $SiO_x$, wherein Me comprises at least one of Al, Si, Ti, Mn, V, Cr, Co or Zr, wherein y is in a range of 0.5-3; and
   a carbon nanotube layer, the carbon nanotube layer coating at least a portion of the oxide $MeO_y$ layer,
   wherein the anode material further comprises a carbon layer obtained by sintering a layer of an organic carbon precursor.

18. An electrochemical device, comprising an anode, wherein the anode comprises an anode material, wherein the anode material comprises:
   a silicon compound $SiO_x$, wherein x is in a range of 0.5-1.5;
   an oxide $MeO_y$ layer, the oxide $MeO_y$ layer coating at least a portion of the silicon compound $SiO_x$, wherein Me comprises at least one of Al, Si, Ti, Mn, V, Cr, Co or Zr, wherein y is in a range of 0.5-3; and
   a carbon nanotube layer, the carbon nanotube layer coating at least a portion of the oxide $MeO_y$ layer,
   wherein the anode material further comprises a carbon layer obtained by sintering a layer of an organic carbon precursor.

19. The electrochemical device according to claim 18, wherein the electrochemical device is a lithium-ion battery.

* * * * *